(12) United States Patent
Miyoshi et al.

(10) Patent No.: US 12,724,264 B2
(45) Date of Patent: Sep. 1, 2026

(54) DISPLAY UNIT AND VEHICULAR DISPLAY DEVICE

(71) Applicant: Yazaki Corporation, Minato-ku (JP)

(72) Inventors: Yuki Miyoshi, Makinohara (JP); Yasuhiro Katsumata, Makinohara (JP); Akira Yamanaka, Makinohara (JP); Hiroshi Sano, Makinohara (JP); Tetsuya Suganuma, Shimada (JP); Yu Kobayashi, Shimada (JP); Naoto Tsubakihara, Makinohara (JP)

(73) Assignee: Yazaki Corporation, Tokyo (JP)

( * ) Notice: Subject to any disclaimer, the term of this patent is extended or adjusted under 35 U.S.C. 154(b) by 252 days.

(21) Appl. No.: 18/634,875

(22) Filed: Apr. 12, 2024

(65) Prior Publication Data

US 2024/0377631 A1 Nov. 14, 2024

(30) Foreign Application Priority Data

May 12, 2023 (JP) ................................. 2023-079590

(51) Int. Cl.
*G02B 27/01* (2006.01)

(52) U.S. Cl.
CPC ................................ *G02B 27/0101* (2013.01)

(58) Field of Classification Search
CPC ............ G02B 27/0101; G02B 27/0149; G02B 27/01; G02B 2027/0196; B60K 35/23; B60K 2360/785; G02F 1/133308; G02F 1/133608; G02F 1/133628; H05K 7/20954
See application file for complete search history.

(56) References Cited

U.S. PATENT DOCUMENTS

| | | | |
|---|---|---|---|
| 11,971,545 B2 * | 4/2024 | Toyoshima ....... | G02F 1/133385 |
| 2022/0326515 A1 | 10/2022 | Katsumata et al. | |

FOREIGN PATENT DOCUMENTS

| | | |
|---|---|---|
| JP | 2007-240769 A | 9/2007 |
| JP | 2009-288484 A | 12/2009 |
| JP | 2022-160754 A | 10/2022 |

* cited by examiner

*Primary Examiner* — Tuyen Tra
(74) *Attorney, Agent, or Firm* — Banner & Witcoff, Ltd.

(57) ABSTRACT

There are provided a display unit and a vehicular display device. The display unit is mounted on a vehicular display device and emits a display image including display light to be projected onto a projection target member provided outside the vehicular display device. The display unit includes: a display panel configured to display the display image based on light from a light source; a case that supports the display panel; and a heat dissipation member configured to dissipate heat accumulated in the display unit. A shield case of the case and the heat dissipation member are connected.

4 Claims, 6 Drawing Sheets

DISPLAY UNIT AND VEHICULAR DISPLAY DEVICE

CROSS-REFERENCE TO RELATED APPLICATIONS

This application is based on and claims priority under 35 USC 119 from Japanese Patent Application No. 2023-079590 filed on May 12, 2023, the contents of which are incorporated herein by reference.

TECHNICAL FIELD

The present disclosure relates to a display unit and a vehicular display device.

BACKGROUND ART

In the related art, a vehicle such as an automated vehicle is equipped with a vehicular display device such as a head-up display (HUD).

For example, the vehicular display device in the related art is configured such that a display image displayed on a display unit (a backlight unit) is projected onto a windshield, a combiner, or the like via an optical system such as a reflection mirror, so that a driver visually recognizes the display image as a virtual image (see JP2022-160754A, for example).

In the vehicular display device in the related art, in a backlight unit, a display image on a display panel of the backlight unit may be disturbed due to external noises. As a noise countermeasure, for example, there is a method in which a housing of the backlight unit (a shield case or the like) is connected to a control unit that controls the backlight unit in the vehicular display device, thereby causing noises to flow from the housing (the shield case or the like) to the control unit. However, in the method, a structure of the backlight unit may be complicated, the degree of freedom in design of the vehicular display device may be lowered, and the like.

SUMMARY OF INVENTION

The present disclosure provides a display unit and a vehicular display device capable of reducing an influence of external noises on a display panel with a simple structure.

In order to achieve the above object, a display unit according to the present disclosure has the following features.

A display unit is mounted on a vehicular display device and emits a display image including display light to be projected onto a projection target member provided outside the vehicular display device. The display unit includes: a display panel configured to display the display image based on light from a light source; a case that supports the display panel; and a heat dissipation member configured to dissipate heat accumulated in the display unit. A shield case of the case and the heat dissipation member are connected.

In order to achieve the above object, a vehicular display device according to the present disclosure has the following features.

A vehicular display device provided on an instrument panel of a vehicle includes: the above display unit; at least one reflection mirror disposed on an optical path of the display light from the display unit to the projection target member and configured to reflect the display light; and a control unit configured to control the display unit.

According to the present disclosure, the relay member and the heat dissipation member are connected, thereby causing external noises to flow from the shield case to the relay member and from the relay member to the heat dissipation member and the control unit. That is, since the noises flowing from the shield case to the relay member flows not only to the control unit but also to the heat dissipation member, the influence of external noises on the display panel can be reduced. Further, according to the present disclosure, only the relay member and the heat dissipation member needs to be connected, and the influence of external noises on the display panel can be reduced with a simple structure.

As described above, according to the present disclosure, it is possible to provide a display unit and a vehicular display device capable of reducing the influence of external noises on a display panel with a simple structure.

The present disclosure has been briefly described above. Further, the details of the present disclosure can be clarified by reading modes (hereinafter, referred to as "embodiments") for carrying out the disclosure described below with reference to the accompanying drawings.

DESCRIPTION OF EMBODIMENTS

Embodiment

Hereinafter, a vehicular display device 1 and a backlight unit 5 (corresponding to a "display unit" of the present disclosure) according to an embodiment of the present disclosure will be described with reference to the drawings.

Schematic Configuration of Vehicular Display Device 1

Figure 1:
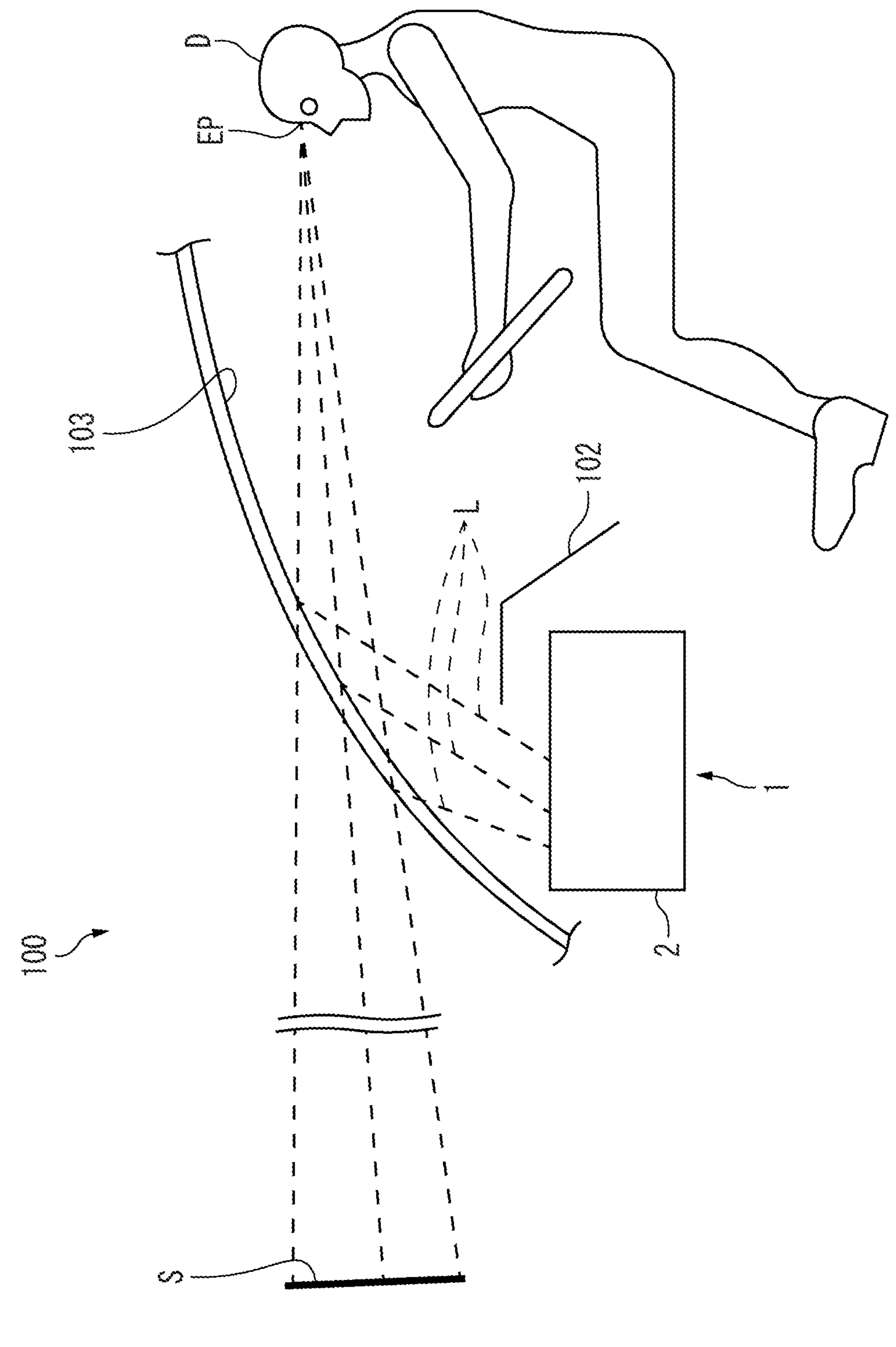
FIG. 1 is a schematic diagram illustrating a schematic configuration of a vehicle equipped with a vehicular display device according to an embodiment of the present disclosure.

Hereinafter, a schematic configuration of the vehicular display device 1 will be described. As illustrated in FIG. 1, the vehicular display device 1 is a head-up display device mounted on a vehicle 100 such as an automated vehicle. The vehicular display device 1 is disposed inside an instrument panel 102 in the vehicle 100, and projects a display image onto a windshield 103 that is a projection target member.

Since the windshield 103 has a semi-transparent property of reflecting a part of incident light and transmitting remaining light, the windshield 103 reflects display light L emitted from the vehicular display device 1 as a display image toward an eye point EP of a driver D while transmitting foreground of the vehicle 100. The driver D recognizes the display image reflected by the windshield 103 as a virtual image S. The virtual image S is recognized by the driver D in front of the windshield 103.

Figure 2:
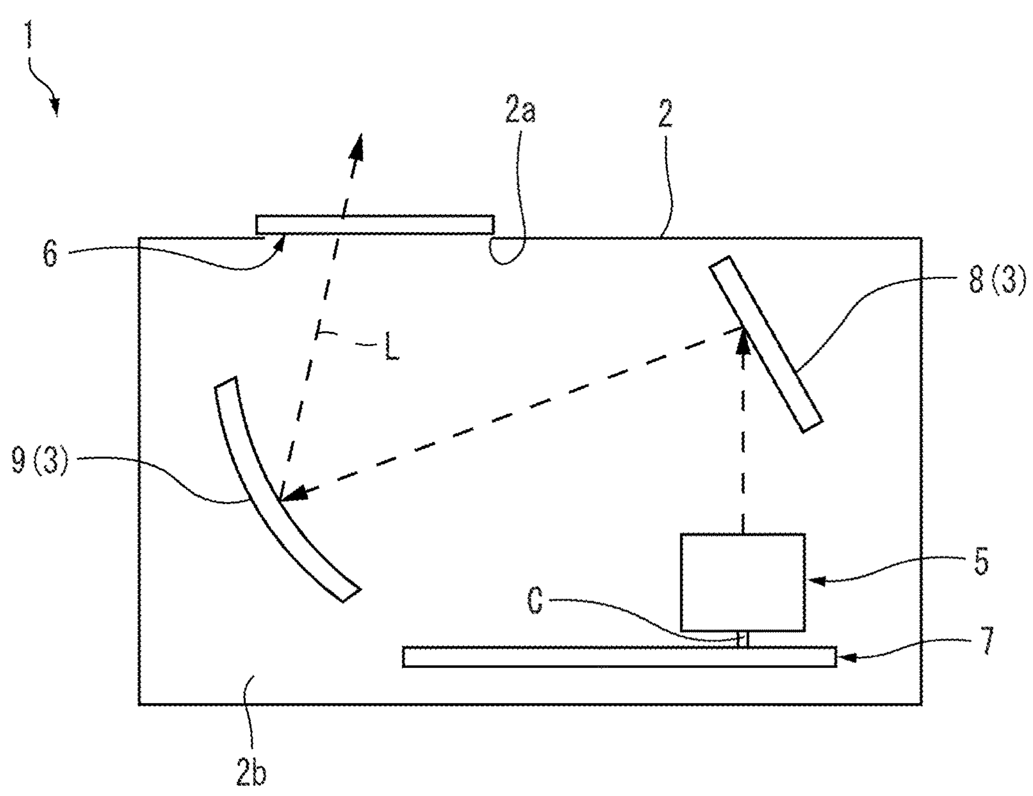
FIG. 2 is a schematic diagram illustrating a schematic configuration of the vehicular display device according to an embodiment of the present disclosure.

As illustrated in FIG. 2, the vehicular display device 1 according to the present embodiment includes a housing 2, two reflection mirrors 3, the backlight unit 5, and a control unit 7.

The housing 2 is formed of, for example, synthetic resin, and is fixed to a vehicle body (not illustrated). As illustrated in FIG. 2, the housing 2 accommodates and supports the backlight unit 5, the two reflection mirrors 3, and the control unit 7 in an internal space 2*b*. The housing 2 has an opening 2*a* through which the outside communicates with the internal space 2*b*.

The opening 2*a* is provided in the housing 2 at a position facing the windshield 103, and is closed by a transparent cover member 6. The display light L emitted from the backlight unit 5 and reflected by the two reflection mirrors 3 is transmitted through the cover member 6. The display light L transmitted through the cover member 6 travels toward the windshield 103.

As illustrated in FIG. 2, the two reflection mirrors 3 are disposed on an optical path of the display light L from the backlight unit 5 to the windshield 103, and reflect the display light L emitted from the backlight unit 5 toward the windshield 103.

The two reflection mirrors 3 include a plane mirror 8 and a concave mirror 9.

The plane mirror 8 has a reflection surface formed as a plane and is disposed at a position facing the backlight unit 5. The reflection surface of the plane mirror 8 totally reflects the display light L emitted from the backlight unit 5 toward the concave mirror 9.

The concave mirror 9 has a reflection surface formed as a concave curved surface and is disposed at a position facing the plane mirror 8. The concave mirror 9 totally reflects the display light L reflected by the plane mirror 8 toward the windshield 103 via the cover member 6. For example, the concave mirror 9 has a function of a magnifying mirror. The concave mirror 9 enlarges and reflects a display image represented by the display light L reflected by the concave mirror 9 such that the display image is relatively larger than a display image represented by the display light L before being reflected by the concave mirror 9.

The backlight unit 5 is an example of a display unit, and emits, as the display light L, a display image to be visually recognized as the virtual image S by the driver D of the vehicle 100. The backlight unit 5 will be specifically described later.

As illustrated in FIG. 2, the control unit 7 is connected to the backlight unit 5 by any connection member (in the present example, a cable C) and controls the backlight unit 5. The control unit 7 includes, for example, an IC chip mounted on a substrate, and is driven by electric power obtained from a battery mounted on the vehicle 100.

Schematic Configuration of Backlight Unit 5 According to First Embodiment

Hereinafter, a schematic configuration of the backlight unit 5 according to a first embodiment of the present disclosure will be described. The backlight unit 5 includes a case 10 provided with a shield case 12 and a backlight case 13, a display panel 11 supported by the case 10, a relay member 17 connected to at least the shield case 12, and a heat dissipation member 18 (see FIG. 3) assembled to the case 10 (the backlight case 13 in the present example).

Figure 3:
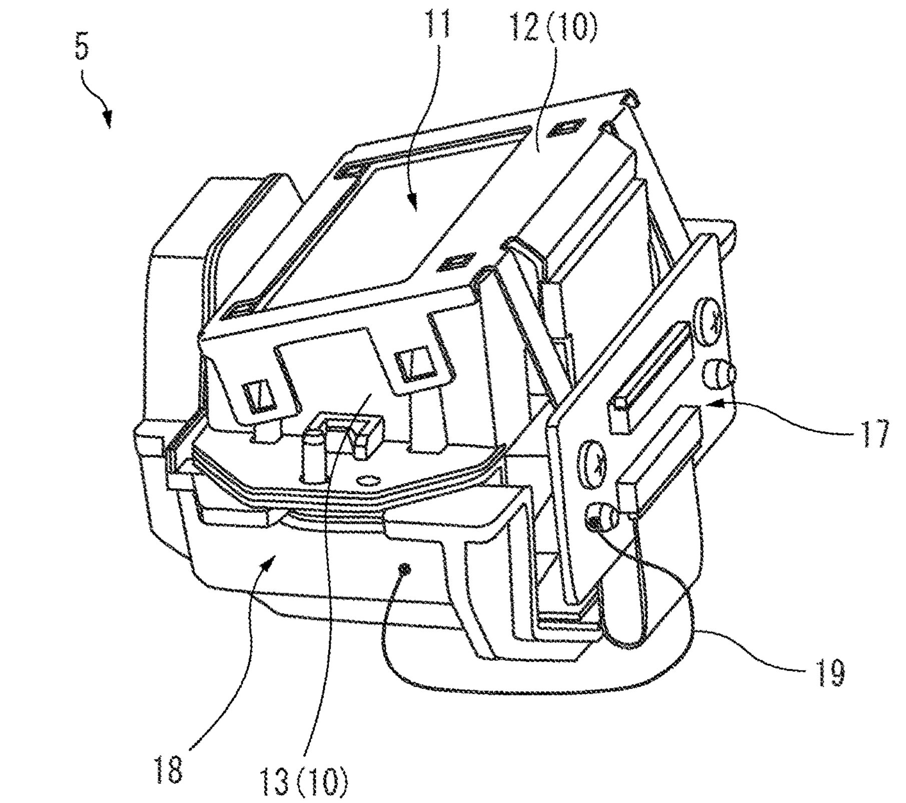
FIG. 3 is a perspective view illustrating a schematic configuration of an external appearance of a backlight unit according to a first embodiment of the present disclosure.

As illustrated in FIG. 3, the case 10 is formed into, for example, a box shape, and supports the display panel 11 along an optical axis direction. In the present example, as described above, the case 10 includes the backlight case 13 having a box shape and the shield case 12 assembled to the backlight case 13 in the vicinity of the display panel 11, and the backlight case 13 may be made of resin or metal. Although the case 10 is implemented by two members in the present example, the case 10 may be implemented by one member, and in this case, the case 10 is the backlight case 13 having a function of the "shield case 12". The backlight case 13 may also be formed of one or more members.

As illustrated in FIG. 3, the display panel 11 is formed into a rectangular shape, and displays a display image based on light from a light source (not illustrated). Specifically, the display panel 11 emits a display image to be projected onto the windshield 103 as the display light L based on light incident from the light source. The display panel 11 is a so-called liquid crystal panel, and is made of, for example, a transparent or semi-transparent thin film transistor (TFT) liquid crystal display.

The display panel 11 has a display area (not illustrated) including a plurality of pixels. In the display area, a plurality of pixels are arranged in a matrix. For example, the display panel 11 displays a display image including a number, a character, a figure, and the like in response to a control signal from the control unit 7. The display area is an area in which a display image is displayed. The display panel 11 is disposed on an optical path of light emitted from the light source, and a display surface opposite to the light source in an optical axis direction emits light when light is radiated from the light source side.

The relay member 17 is, for example, a substrate, is connected to, for example, the shield case 12 as illustrated in FIG. 3, and is connected to an internal device of the case 10 (the backlight case 13 in the present example) or the display panel 11 by a cable C1 (see FIG. 4) or the like. That is, the relay member 17 has a function of relaying a connection between the backlight unit 5 and the control unit 7. One end of a cable C is connected to the relay member 17, and the other end of the cable C is connected to the control unit 7, thereby connecting the backlight unit 5 and the control unit 7 (see FIGS. 2 and 4). The cables C and C1 may be a known cable or a flexible printed circuit (FPC), and are not particularly limited.

Figure 4:
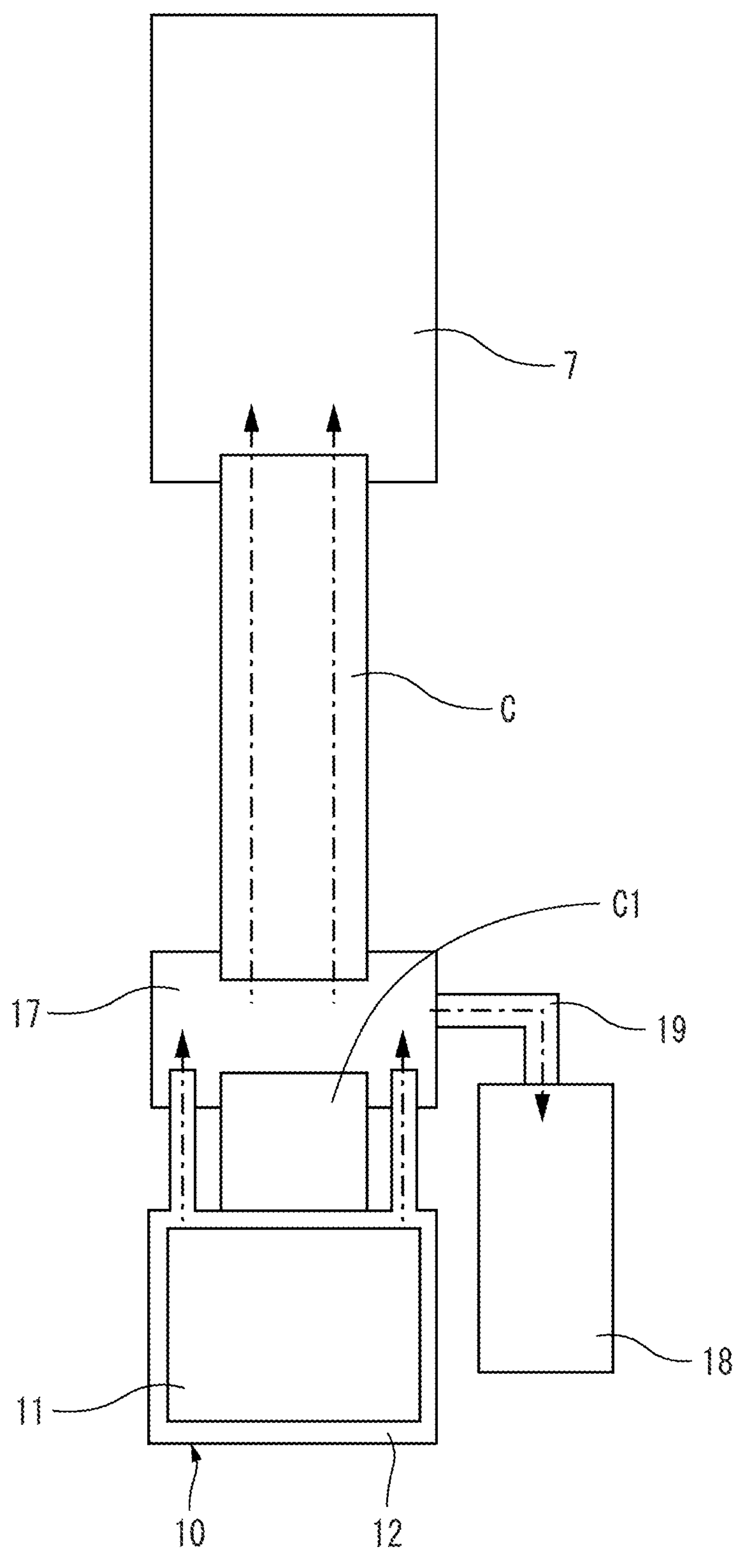
FIG. 4 is a schematic diagram illustrating a schematic configuration of a noise countermeasure in the backlight unit illustrated in FIG. 3.

The relay member 17 is connected to the heat dissipation member 18 from the viewpoint of noise countermeasure (which will be described later). In the present example, as illustrated in FIGS. 3 and 4, the relay member 17 and the heat dissipation member 18 are connected by a connection member 19. The connection member 19 may be a lead wire, a cable, a bus bar, an FPC, or the like, and is not particularly limited.

The heat dissipation member 18 is, for example, a heat sink, is attached to an outer side of the case 10 (the backlight case 13), and is connected to the relay member 17, as illustrated in FIG. 3. The heat dissipation member 18 has a function of dissipating heat accumulated in the backlight unit 5 to the outside.

Virtual Image Display Operation in Vehicular Display Device 1

Hereinafter, a virtual image display operation in the vehicular display device 1 will be described. First, in the backlight unit 5 (or a backlight unit 5A to be described later), light emitted from a light source is emitted toward the display panel 11 as in a known backlight unit. The display panel 11 emits a display image displayed in the display area as the display light L based on light transmitted through an inner side of the backlight unit 5.

The display light L emitted from the display panel 11 of the backlight unit 5 (or the backlight unit 5A to be described later) travels toward the plane mirror 8. The plane mirror 8 reflects the display light L incident from the backlight unit 5 toward the concave mirror 9. A concave reflection surface of the concave mirror 9 reflects the display light L incident from the plane mirror 8 toward the windshield 103 via the cover member 6. Accordingly, a display image corresponding to the display light L is projected onto the windshield 103, and the virtual image S is displayed in front of the eye point EP of the driver D.

Noise Countermeasure of Backlight Unit 5 According to First Embodiment

Hereinafter, a noise countermeasure of the backlight unit 5 will be described. Generally, a video of the display panel 11 of the backlight unit 5 may be disturbed due to an influence of external noises. Therefore, in the present example, the relay member 17 and the heat dissipation member 18 are connected by the connection member 19 (see FIGS. 3 and 4). Accordingly, as illustrated in FIG. 4, external noises flow from the shield case 12 to the relay member 17, and then flow from the relay member 17 to the heat dissipation member 18 and the control unit 7 (see arrows in FIG. 4) in the backlight unit 5.

That is, according to the present embodiment, noises flowing from the shield case 12 to the relay member 17 flow not only to the control unit 7 but also to the heat dissipation member 18, thereby reducing the influence of the noises on the display panel 11. Only the relay member 17 and the heat dissipation member 18 needs to be connected, and the influence of noises on the display panel 11 can be reduced with a simple structure. As described above, according to the present embodiment, the influence of external noises on the display panel 11 can be reduced with a simple structure.

Further, according to the present embodiment, since a noise countermeasure can be taken using the backlight unit 5 alone as described above, an increase in the number of components can be prevented without mounting a component for the noise countermeasure on the vehicular display device 1.

Furthermore, according to the present embodiment, an increase in the number of components can be prevented as described above, and thus an increase in a size of the backlight unit 5 can be prevented.

Furthermore, according to the present embodiment, since the relay member 17 is provided, the backlight unit 5 does not need to be disposed in the vicinity of the control unit 7 in the internal space 2*b* of the housing 2, and the degree of freedom in design is improved in the vehicular display device 1 (particularly, the internal space 2*b* of the housing 2).

Modification

Figure 5:
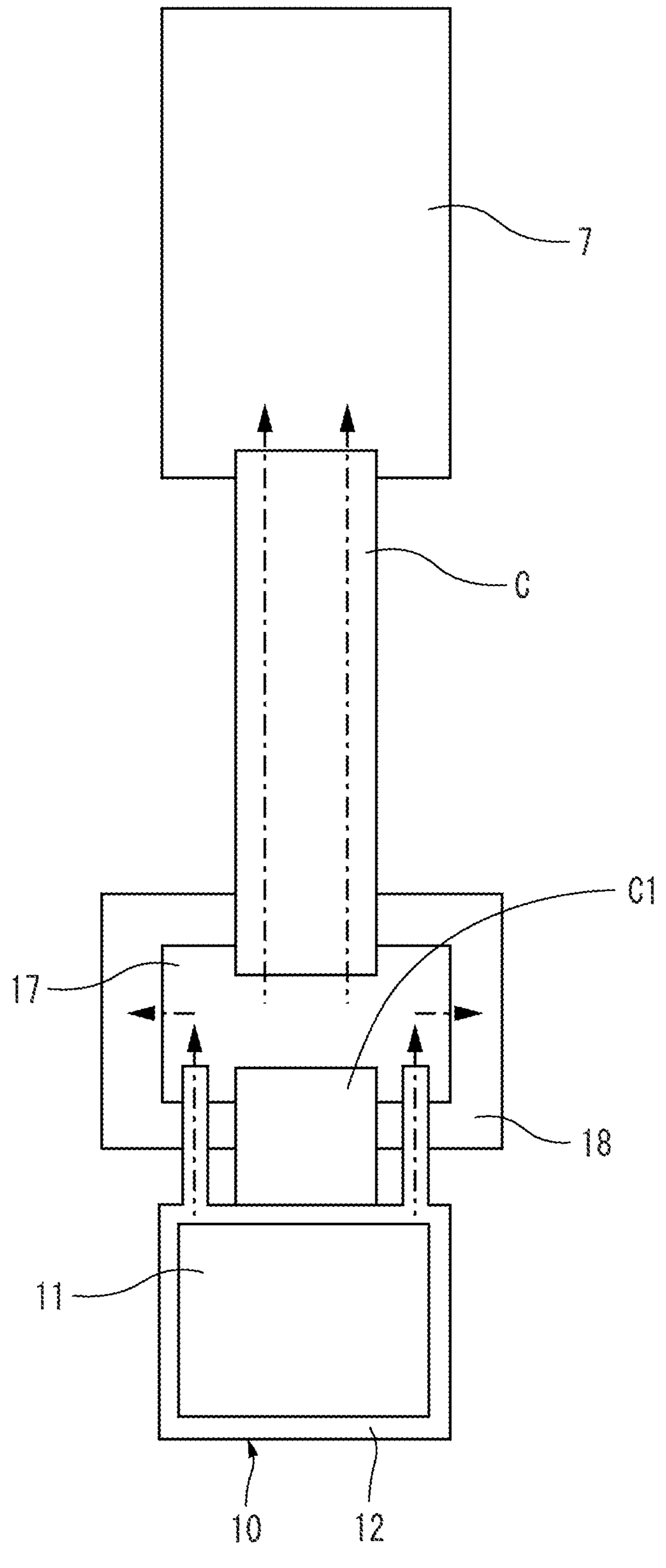
FIG. 5 is a schematic diagram illustrating a modification of FIG. 4.

As illustrated in FIG. 5, the relay member 17 and the heat dissipation member 18 may be in contact or the like and directly connected to each other without the connection member 19 in the backlight unit 5. In this case, for example, the heat dissipation member 18 is preferably provided with a mechanism for holding the relay member 17 from the viewpoint of a noise countermeasure.

Schematic Configuration of Backlight Unit 5A According to Second Embodiment

Hereinafter, a schematic configuration of the backlight unit 5A according to a second embodiment of the present disclosure will be described. The backlight unit 5A includes a case 10A including a shield case 12A and a backlight case 13A, a display panel 11A supported by the case 10A, and a heat dissipation member 18A (see FIG. 6) assembled to the backlight case 13A and connected to the shield case 12A.

Figure 6:
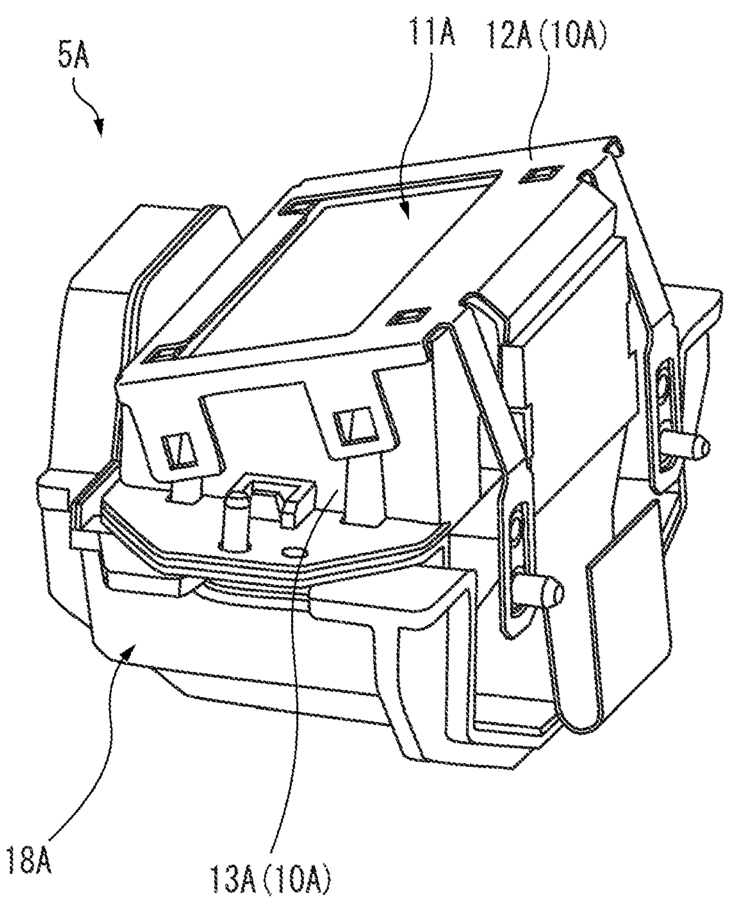
FIG. 6 is a perspective view illustrating a schematic configuration of an external appearance of a backlight unit according to a second embodiment of the present disclosure.

As illustrated in FIG. 6, the case 10A is formed into, for example, a box shape, and supports the display panel 11A along an optical axis direction. In the present example, as described above, the case 10A includes the backlight case 13A having a box shape and the shield case 12A assembled to the backlight case 13A in the vicinity of the display panel 11A, and the backlight case 13A may be made of resin or metal. Although the case 10A is implemented by two members in the present example, the case 10A may be implemented by one member, and in this case, the case 10A is the backlight case 13A having a function of the "shield case 12A". The backlight case 13A may also be formed of one or more members.

As illustrated in FIG. 6, the display panel 11A is formed into a rectangular shape, and displays a display image based on light from a light source (not illustrated). Specifically, the display panel 11A emits a display image to be projected onto the windshield 103 as the display light L based on light incident from the light source. The display panel 11A is a so-called liquid crystal panel, and is made of, for example, a transparent or semi-transparent thin film transistor (TFT) liquid crystal display.

The display panel 11A has a display area (not illustrated) including a plurality of pixels. In the display area, a plurality of pixels are arranged in a matrix. For example, the display panel 11A displays a display image including a number, a character, a figure, and the like in response to a control signal from the control unit 7. The display area is an area in which a display image is displayed. The display panel 11A is disposed on an optical path of light emitted from the light source, and a display surface opposite to the light source in an optical axis direction emits light when light is radiated from the light source side.

The heat dissipation member 18A is, for example, a heat sink, is attached to an outer side of the backlight case 13A, and is connected to the shield case 12A, as illustrated in FIG. 6. The heat dissipation member 18A has a function of dissipating heat accumulated in the backlight unit 5A to the outside.

An internal device of the case 10A (in the present example, the backlight case 13A) is connected to the control unit 7 via a cable C (see FIG. 7), the shield case 12A, and the like. That is, one end of the cable C is connected to the shield case 12A (connected to the internal device or the display panel 11A), and the other end of the cable C is connected to the control unit 7, thereby connecting the backlight unit 5A and the control unit 7 (see FIG. 7). The cable C may be a known cable or a flexible printed circuit (FPC), and is not particularly limited.

Noise Countermeasure of Backlight Unit 5A According to Second Embodiment

Figure 7:
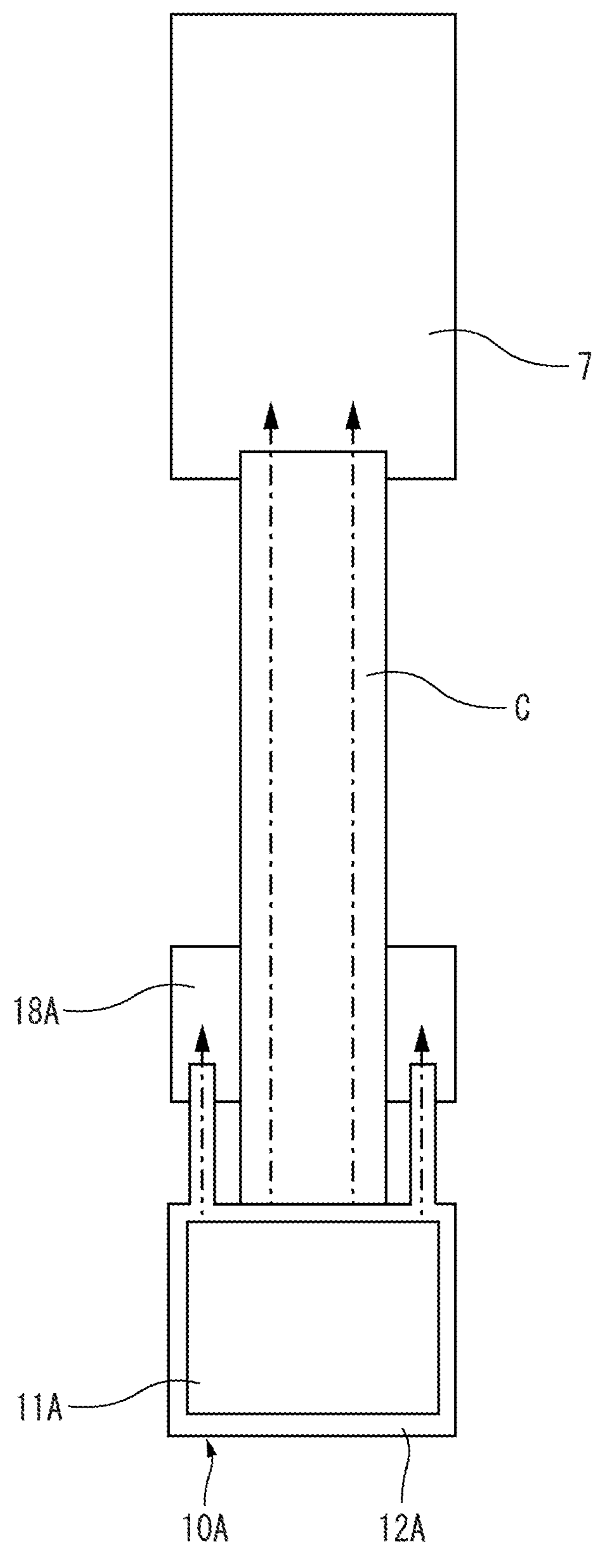
FIG. 7 is a schematic diagram illustrating a schematic configuration of a noise countermeasure in the backlight unit illustrated in FIG. 6.

Hereinafter, a noise countermeasure of the backlight unit 5A will be described. Generally, a video of the display panel 11A of the backlight unit 5A may be disturbed due to an influence of external noises. Therefore, the shield case 12A and the heat dissipation member 18A are connected to each other (see FIG. 7) in the present example. Accordingly, as illustrated in FIG. 7, external noises flow from the shield case 12A to the heat dissipation member 18A and the control unit 7 (see arrows in FIG. 7) in the backlight unit 5A.

That is, according to the present embodiment, noises flow from the shield case 12A not only to the control unit 7 but also to the heat dissipation member 18A, thereby reducing the influence of noises on the display panel 11A. As described above, the influence of noises on the display panel 11A can be reduced with a simple structure in the present embodiment. That is, according to the present embodiment, the influence of external noises on the display panel 11A can be reduced with a simple structure.

Further, according to the present embodiment, since a noise countermeasure can be taken using the backlight unit 5A alone as described above, an increase in the number of components can be prevented without mounting a component for the noise countermeasure on the vehicular display device 1.

Furthermore, according to the present embodiment, an increase in the number of components can be prevented as described above, and thus an increase in a size of the backlight unit 5A can be prevented.

OTHER EMBODIMENTS

The present disclosure is not limited to the embodiments described above and can be appropriately modified, improved and the like. In addition, materials, shapes, sizes, numbers, arrangement positions and the like of components in the embodiments described above are freely selected and are not limited as long as the present disclosure can be implemented.

Here, features of embodiments of the display unit and the vehicular display device according to the present disclosure described above are briefly summarized and listed in the following aspects 1 to 5.

According to an aspect 1 of the present disclosure, a display unit (5, 5A) is mounted on a vehicular display device (1) and emits a display image including display light (L) to be projected onto a projection target member (103) provided outside the vehicular display device (1). The display unit includes: a display panel (11, 11A) configured to display the display image based on light from a light source; a case (10, 10A) that supports the display panel (11, 11A); and a heat dissipation member (18, 18A) configured to dissipate heat accumulated in the display unit (5, 5A). A shield case (12, 12A) of the case (10, 10A) and the heat dissipation member (18, 18A) are connected.

According to an aspect 2 of the present disclosure, in the aspect 1, the display unit (5) further includes a relay member (17) configured to relay a connection between the display unit (5) and a control unit (7) of the vehicular display device (1) configured to control the display unit (5), and relay a connection between the shield case (12) and the heat dissipation member (18).

According to an aspect 3 of the present disclosure, in the aspect 2, the relay member (17) and the heat dissipation member (18) are connected via a connection member (19).

According to an aspect 4 of the present disclosure, in the aspect 2, the relay member (17) and the heat dissipation member (18) are in contact and connected to each other.

According to an aspect 5 of the present disclosure, a vehicular display device (1) provided on an instrument panel (102) of a vehicle (100) includes: the display unit (5, 5A) according to any one of the aspects 1 to 4; at least one reflection mirror (3) disposed on an optical path of the display light (L) from the display unit (5, 5A) to the projection target member (103) and configured to reflect the display light (L); and a control unit (7) configured to control the display unit (5, 5A).

According to the configurations of the aspects 1 to 5, the relay member and the heat dissipation member are connected, thereby causing external noises to flow from the shield case to the relay member and from the relay member to the heat dissipation member and the control unit. That is, since the noises flowing from the shield case to the relay member flows not only to the control unit but also to the heat dissipation member, the influence of external noises on the display panel can be reduced. Further, according to the present disclosure, only the relay member and the heat dissipation member needs to be connected, and the influence of external noises on the display panel can be reduced with a simple structure. As described above, the influence of external noises on the display panel can be reduced with a simple structure.

Furthermore, according to the above configurations, since the noise countermeasure can be taken using the display unit alone as described above, an increase in the number of components can be prevented without mounting a component for the noise countermeasure on the vehicular display device.

Furthermore, according to the above configurations, an increase in the number of components can be prevented as described above, and thus an increase in a size of the display unit can be prevented.

Furthermore, according to the above configurations, since the relay member is provided, the display unit does not need to be disposed in the vicinity of the control unit, and the degree of freedom in design of the vehicular display device is improved.

What is claimed is:

1. A display unit that is mounted on a vehicular display device and emits a display image including display light to be projected onto a projection target member provided outside the vehicular display device, the display unit comprising:

a display panel configured to display the display image based on light from a light source;

a case that supports the display panel;

a heat dissipation member configured to dissipate heat accumulated in the display unit; and a relay member configured to relay a connection between the display unit and a control unit of the vehicular display device configured to control the display unit, and relay a connection between a shield case of the case and the heat dissipation member, wherein the shield case of the case and the heat dissipation member are connected via the relay member.

2. The display unit according to claim 1, wherein the relay member and the heat dissipation member are connected via a connection member.

3. The display unit according to claim 1, wherein the relay member and the heat dissipation member are in contact and connected to each other.

4. A vehicular display device provided on an instrument panel of a vehicle, the vehicular display device comprising:

the display unit according to claim 1;

at least one reflection mirror disposed on an optical path of the display light from the display unit to the projection target member and configured to reflect the display light; and a control unit configured to control the display unit.

* * * * *